United States Patent [19]

Suenaga et al.

[11] Patent Number: 4,892,926
[45] Date of Patent: Jan. 9, 1990

[54] THERMOTROPIC LIQUID CRYSTAL POLYESTERS AND A METHOD FOR THEIR PRODUCTION

[75] Inventors: Jun-ichi Suenaga; Hisayuki Naito; Singo Sasaki, all of Kyoto, Japan

[73] Assignee: Unitika Ltd., Hyogo, Japan

[21] Appl. No.: 175,795

[22] Filed: Mar. 31, 1988

[30] Foreign Application Priority Data

Mar. 31, 1987 [JP] Japan .................................. 62-80454
Apr. 22, 1987 [JP] Japan .................................. 62-99451

[51] Int. Cl.$^4$ ...................... C08G 63/18; C08G 63/16
[52] U.S. Cl. .................................... 528/305; 525/434; 528/302; 252/299.01; 252/299.6
[58] Field of Search ............... 525/437; 528/302, 305; 252/299.01, 299.6

[56] References Cited

U.S. PATENT DOCUMENTS 3,778,410 12/1973 Kuhfuss et al. .................... 525/437

OTHER PUBLICATIONS

Jackson, W. J. et al, J. Polymer Sci., 14:2043–2058 (1976).
Patent Abstracts of Japan, vol. 11, No. 290 (1987).
Patent Abstracts of Japan, vol. 7, No. 181 (1983).
Patent Abstracts of Japan, vol. 10, No. 36 (1986).

Primary Examiner—John C. Bleutge
Assistant Examiner—A. Carrillo
Attorney, Agent, or Firm—Sughrue, Mion, Zinn, Macpeak & Seas

[57] ABSTRACT

A thermotropic liquid crystal polyester consisting essentially of ethylene glycol residue, terephthalic acid residue and parahydroxybenzoic acid residue wherein the mol ratio of ethylene glycol residue to terephthalic acid residue is substantially about 1:1 and the mol ratio of terephthalic acid residue to parahydroxybenzoic acid residue is in the range of about 5:95 to about 25:75, the polyester having an intrinsic viscosity of at least about 0.5 dl/g measured in a 50:50 by weight solvent mixture of phenol and 1,1,2,2-tetrachlorethane at 20° C., and a transmittance of at least about 80% to 530 nm light at a light path length of 10 mm measured using a 0.4 wt. % solution of the polyester in said solvent mixture. A method for forming the thermotropic liquid crystal polyester is also disclosed. The liquid crystal polyester of the present invention is useful for injection molding applications and various extrusion molding purposes, such as the manufacture of films, sheets, fibers, pipes, etc.

4 Claims, No Drawings

THERMOTROPIC LIQUID CRYSTAL POLYESTERS AND A METHOD FOR THEIR PRODUCTION

FIELD OF THE INVENTION

The present invention relates in one aspect to thermotropic liquid crystal polyesters (hereinafter "liquid crystal polyesters") and in another aspect to a method for production of liquid crystal polyesters. More particularly, the invention relates to a liquid crystal polyester with excellent heat resistance and improved melt processability and a method of manufacturing the same.

BACKGROUND OF THE INVENTION

Polyesters have already got widespread recognition as resins for general molding use but because of their inadequacies in various mechanical characteristics, such as flexual strength, flexual modulus, etc., many polyesters are unsuitable for practical applications calling for high performance.

Recent years, there are increasing demands for new materials that have superior in strength, rigidity, heat resistance, resistance to chemicals and so on in fields such as textile fibers, films, general moldings, etc.

As a harbinger of a liquid crystal polyester possessing such high performance characteristics, W. J. Jackson et al. reported on a liquid crystal copolyester consisting exclusively of the ester bonds of ethylene terephthalate and parahydroxybenzoic acid in *J. Polm. Sci. Polym. Chem. Ed.*, 14, 2043 (1976) and U.S. Pat. No. 3,804,805, and there has since been a mounting interest in such liquid crystal polyesters. Compared with ordinary polyesters which does not show liquid crystalinity, the above-mentioned liquid crystal polyester has much superior mechanical characteristics, thus being regarded as a new type of high performance resin. Particularly, those species rich in parahydroxybenzoic acid residues are considered to be promising engineering plastics with extremely high heat resistance.

The method for manufacture of the above polyester is described in U.S. Pat. No. 3,778,410. According to this patent, polyethylene terephthalate and paraacetoxybenzoic acid are first heated in an inert gas atmosphere for acidolysis reaction to form polyester fragments and, then, the pressure of reaction system is reduced to cause a viscosity increase to thereby give the desired product.

However, the manufacture of a liquid crystal polyester by the above method presents the following problems. First, no matter how one attempts to increase the agitation speed or improve the conditions of acidolysis, a highly blocked polymer fraction due to block polymerization of parahydroxybenzoic acid comes out as an insoluble and infusible impurity (hereinafter "homopolymer") whenever the proportion of parahydroxybenzoic acid component is not less than 75 mol%. The result is that the final liquid crystal polyester assumes as if it contained an organic filler and shows a reduced fluidity, thus seriously interfering with the discharging operation after the polymerization reaction. This in turn makes the melt-polymerization substantially impractical and interferes with subsequent processing operations such as injection molding, detracts from the heat resistance and mechanical properties (particularly heat deformation temperature and Izod impact strength) of the final moldings, and leads to a rough molded surface.

As an indicator of the presence of the formation of a homopolymer, the solubility of the product in a 50:50 by weight mixture of phenol and 1,1,2,2-tetrachlorethane (about 60/40 by volume) (hereinafter "solvent mixture") may be utilized. Thus, a homopolymer-rich liquid crystal polyester is either insoluble in the solvent mixture or simply dispersed therein as white turbidity. By way of illustration, according to the above-mentioned report of W. J. Jackson et al., *J. Polym. Sci. Polym. Chem. Ed.*, 14, 2043 (1976), a liquid crystal polyester with a terephthalic acid residue-to-parahydroxybenzoic acid residue mol ratio of 20:80 was insoluble in the solvent mixture and, hence, the intrinsic viscosity determination was not made.

U.S. Pat. No. 3,804,805 claims a polymer with an intrinsic viscosity of not less than 0.4, but the technology described therein is only relevant to polymers soluble in the solvent mixture for viscosity determination and there is no specific statement referring to a liquid crystal polyester containing a high mol proportion of parahydroxybenzoic acid component such as the liquid crystal polyester according to the present invention.

Thus, using known production technology there has never been obtained a liquid crystal polyester which contains the parahydroxybenzoic acid unit in such a high proportion and is yet soluble in solvent mixture substantially without losing its clarity, that is to say, free of the homopolymer arising from the block polymerization of parahydroxybenzoic acid.

SUMMARY OF THE INVENTION

An object of the present invention is to provide a highly heat-resistant liquid crystal polyester and a method for manufacturing the same.

Another object of the present invention is to provide a homopolymer-free liquid crystal polyester and a method for manufacturing the same.

A further object of the present invention is to provide a liquid crystal polyester with improved melt processability and a method for manufacturing the same.

Still another object of the present invention is to provide a liquid crystal polyester which is free of disadvantageous properties, such as the aforesaid interference with injection molding and other subsequent processings, impairment of heat resistance and mechanical properties (particularly the heat deformation temperature and Izod impact strength) of final products, and roughening of the product surface.

The present inventors conducted intensive research towards developing a liquid crystal polyester free of the above-mentioned disadvantages inherent in known liquid crystal polyesters, and have found that the above and other objects and advantages are accomplished by the liquid crystal polyester and the manufacturing method therefor which are provided by the present invention described hereinbelow.

Thus, the present invention is directed to a thermotropic liquid crystal polyester consisting essentially of ethylene glycol residue, terephthalic acid residue, and parahydroxybenzoic acid residue, wherein the mol ratio of ethylene glycol residue to terephthalic acid residue is substantially about 1:1 and the mol ratio of terephthalic acid residue to parahydroxybenzoic acid residue is in the range of about 5:95 to about 25:75, wherein the intrinsic viscosity of the liquid crystal polyester is at least about 0.5 dl/g measured in a 50:50 by weight solvent mixture of phenol and 1,1,2,2-tetrachlorethane at 20° C., and transmittance of 530 nm light at a light path length of 10 mm is at least about 80% measured using a 0.4 wt% solution of the liquid crystal polyester in the solvent mixture.

In another aspect, the present invention relates to a method of producing a thermotropic liquid crystal polyester consisting essentially of ethylene glycol residue, terephthalic acid residue and parahydroxybenzoic acid residue, wherein the mol ratio of ethylene glycol residue to terephthalic acid residue is substantially about 1:1 and the mol ratio of terephthalic acid residue to parahydroxybenzoic acid residue is in the range of about 5/95 to about 25/75, which comprises blending polyethylene terephthalate and paraacetoxybenzoic acid to form a mixture such that the mol ratio of terephthalic acid residue to parahydroxybenzoic acid residue is in the range of about 30:70 to about 70:30, heat-melting the mixture to cause an acidolysis reaction providing a mixture containing polyester fragments, adding a further amount of paraacetoxybenzoic acid to the mixture containing polyester fragments to cause a further acidolysis reaction and to complete formation of the desired polyester, and reducing the pressure of the reaction system to cause an increase in viscosity of the resulting polyester.

In further aspect, the present invention relates to a thermotropic liquid crystal polyester produced by the above method having an intrinsic viscosity of at least about 0.5 dl/g measured in a 50:50 by weight solvent mixture of phenol and 1,1,2,2-tetrachlorethane at 20° C., and a transmittance of at least about 80% to 530 nm light at a light path length of 10 nm measured using a 0.4 wt% solution of the polyester in said solvent mixture.

The polyester according to the present invention is a liquid crystal polyester which exhibits exceedingly high performance characteristics as to heat resistance, strength and bending modulus and also has an improved melt-processability. Moreover, in accordance with the method of the present invention, such liquid crystal polyester can be easily manufactured.

The liquid crystal polyester according to the present invention is also superior in injection molding and other post-processing properties, show excellent heat resistance and mechanical properties when molded to final products, and is free of disadvantage of a rough molded surface. Therefore, as a high performance resin, the present liquid crystal polyester is not only useful for various injection molding applications but also useful for various extrusion molding purposes, such as for the manufacture of films, sheets, fibers, pipes, etc.

DETAILED DESCRIPTION OF THE INVENTION

The liquid crystal polyester according to the present invention consisting essentially of ethylene glycol residue, terephthalic acid residue and parahydroxybenzoic acid residue. In the present invention, the mol ratio of terephthalic acid residue to parahydroxybenzoic acid residue is in the range of about 5:95 to about 25:75 and, from the standpoints of moldability and thermal endurance, is preferably in the range of 10:90 to 22:78 and more desirably in the range of 15:85 to 22:78. If this mol ratio is less than about 5:95, substantially no heat melting takes place. Conversely if the ratio exceeds about 25:75, the thermal endurance of the resulting polyester is decreased.

The intrinsic viscosity ($\eta$) of the liquid crystal polyester according to the present invention, as measured in about a 50:50 by weight mixture of phenol and 1,1,2,2-tetrachlorethane at 20° C., is not less than about 0.5 dl/g and preferably not less than 0.6 dl/g. If the intrinsic viscosity is less than about 0.5 dl/g, the heat deformation temperature, Izod impact strength and other thermal and mechanical characteristics of the final product will deteriorate to some extent. On the other hand, from moldability points of view, the intrinsic viscosity of the polyester is preferably not more than about 1.2 dl/g and more desirably not more than 1.0 dl/g. However, there is no strict upper limit of the intrinsic viscosity of the present liquid crystal polyester, these values simply defining preferred upper values.

The liquid crystal polyester according to the present invention has a transmittance, with respect to light at 530 nm, of at least about 80%, preferably not less than 90% and, for still better results, not less than 95%, as measured using a 0.4 wt% solution in the aforementioned solvent mixture for viscosity determination at a light path length of 10 mm. Polyesters with transmittance values less than about 80% contain much amount of homopolymers and yield final products with rough surfaces, inadequate Izod impact, tensile strength and flexural modulus, and notwithstanding the fact that its composition is the same as the comparable homopolymer-free polyester, with an appreciably lower thermal deformation temperature.

The term "transmittance" as used herein means the value determined in the following manner. The liquid crystal polyester to be tested is comminuted to a size range passing through a 38-mesh sieve and 0.08 g of the resulting powder is placed in 19.92 g of a 50:50 (by weight) solvent mixture of phenol and 1,1,2,2-tetrachlorethane. The mixture is then heated at 140° to 155° C. and if necessary at 140° to 160° C. with stirring for 0.5 to 2 hours. The resulting solution is put in a quartz glass cell with a light pbath length of 10 mm and using the solvent mixture as a blank, the transmission of 530 nm light is measured with a spectrophotometer (UV-150-02, manufactured by Shimadzu Corporation). The following equation is used for the calculation of the transmittance of the test sample.

$$\text{Transmittance (\%)} = \frac{\text{Intensity of transmitted light}}{\text{Intensity of incident light}} \times 100$$

The liquid crystal polyester according to the present invention can be manufactured by the following two-step or more-than-2-step process.

In the first step, polyethylene terephthalate and paraacetoxybenzoic acid are mixed in a ratio of about 30:70 to about 70:30 (in terms of the mol ratio of terephthalic acid residue to parahydroxybenzoic acid residue) and the resulting mixture is melted under heating, preferably in an inert gas atmosphere to cause an acidolysis reaction, whereby polyester fragments are produced. In this step, mere mix-melting of polyethylene terephthalate and paraacetoxybenzoic acid triggers an acidolysis reaction to give polyester fragments on cleavage by parahydroxybenzoic acid. This acidolysis reaction must be conducted under such conditions that the ratio of terephthalic acid residue to parahydroxybenzoic acid residue will be within the range of about 30:70 to about 70:30. If this ratio exceeds about 70:30 during the acidolysis reaction, the viscosity gain is retarded in the subsequent pressure-reducing procedure and the likelihood of formation of a homopolymer in the next step is increased. On the other hand, if the above ratio is less than about 30/70, the aforesaid homopolymers is produced even in the stage of prepolymer synthesis. The acidolysis reaction is conducted in an inert gas atmosphere such as nitrogen gas or argon gas, and preferably in a constant current of such an inert gas. If an active gas such as oxygen is present, an oxidation reaction will take place which interferes with the production of a satisfactory polymer. In order to allow the acidolysis reaction to proceed at a rapid rate, the reaction is preferably conducted at a temperature not less than 240° C., while for the purpose of preventing discoloration, the reaction is preferably carried out a temperature not exceeding 310° C. and particularly not higher than 280° C. Generally, this acidolysis reaction goes to completion with a gradually diminishing production of acetic acid in about 20 to 150 minutes after complete melting of the starting materials.

After the acidolysis reaction, one may proceed directly to the second step. However, it is preferable to interpose an intermediate pressure-reducing procedure to cause a viscosity increase and convert the polyester fragments into a prepolymer with an intrinsic viscosity of not less than about 0.2 and particularly not less than 0.3. This pressure-reducing procedure minimizes the formation of homopolymers and facilitates the viscosity build-up in the next step. For the purpose of accomplishing the aforesaid objects of the present invention and also in consideration of the time required for the viscosity increase, the intrinsic viscosity of the prepolymer is preferably not more than about 1.0.

On the other hand, the process in which the acidolysis reaction product is directly subjected to the second step without intermediate pressure reduction and viscosity increase has the advantage of fewer production steps and, therefore, is preferred from commercial and economic points of view.

In the second process step, the prepolymer or fragment melt obtained in the first step is supplied with an additional amount of paraacetoxybenzoic acid to compensate for the deficiency for the formation of the desired liquid crystal polyester and the same acidolysis reaction as the first step is carried out. Thus, paraacetoxybenzoic acid is added to the prepolymer or fragments and the mixture is melted under heating to cause further acidolysis. Then, the pressure of reaction system is reduced to cause a further viscosity increase, whereby a liquid crystal polyester having satisfactory physical properties is produced.

The addition of paraacetoxybenzoic acid may be carried out in a single dose or in 2 or more installments, or may even be added continuously. In order to obtain a liquid crystal polyester lean in homopolymers, paraacetoxybenzoic acid is preferably added either in installments or continuously but the addition in a single dose is preferred from commercial points of view, for this procedure contributes to a shorter overall production time. The acidolysis reaction in this second step also proceeds upon mere heating. Where paraacetoxybenzoic acid is added in a single dose, the acidolysis reaction is completed in 20 to 150 minutes as in the acidolysis reaction in the first step. Where paraacetoxybenzoic acid is added in two or more installments, the addition interval preferably corresponds to the time period required for a substantial completion of acidolysis by the paraacetoxybenzoic acid previously added. In this case, too, the acidolysis reaction is generally continued for 20 to 150 minutes after complete addition of paraacetoxybenzoic acid. Where paraacetoxybenzoic acid is added continuously, the acidolysis reaction proceeds concurrently with the addition of paraacetoxybenzoic acid. In this case, too, the acidolysis reaction is generally continued for 20 to 150 minutes after complete addition of paraacetoxybenzoic acid. Where the addition is made in installments or continuously, the addition is preferably completed within 5 hours, preferably within 3 hours, in order to prevent discoloration of the resin. Paraacetoxybenzoic acid may be added in solid form, but if the air is entrained, the reaction may be retarded or other adverse effects such as discoloration may take place. Therefore, it is recommended to purge the air from the charge vessel with an inert gas, for example, by using a nitrogen purging chamber. For commercial production purposes, it is preferable to melt paraacetoxybenzoic acid under heating and add the resulting liquid. In adding paraacetoxybenzoic acid to the prepolymer, the acid may be added directly to the prepolymer melt or alternatively one may employ a procedure such as taking out the intermediate product, e.g., in the form of chips, and, then, adding paraacetoxybenzoic acid to the cooled chips.

This acidolysis reaction is conducted in the same manner as the first step reaction in an inert gas atmosphere and preferably in a constant current of the inert gas and the pressure of reaction system is then reduced to cause a viscosity increase. The higher the pressure-reducing degree, the faster is the byproduct acetic acid distilled off so that the reaction is completed sooner. Therefore, the reduction of pressure is generally carried out usng a vacuum of about 1.0 Torr or less and preferably 0.5 Torr or less.

In the practical operation of the present invention, the above reaction may be carried out in more than two steps, if desired.

Furthermore, within a range not contrary to the above objects of the invention, other monomers such as aliphatic diols, e.g., ethylene glycol, 1,2-propanediol, 1,3-propanedoil, 1,2-butanediol, 1,3-butanediol, 1,4-butanediol, 2,3-butanediol, 2-butene-1,4-diol, etc., aromatic or alicyclic diols, e.g., 4,4'-biphenol, 1,4-cyclohexanedimethanol, etc., aliohatic dicarboxylic acids, e.g., adipic acid, sebacic acid, etc., alicyclic or aromatic dicarboxylic acids, e.g., cyclohexanedicarboxylic acid, 2,6-naphthalenedicarboxylic acid, etc., and hydroxycarboxylic acids such as 2-hydroxy-6-naphthoic acid and so on, may be copolymerized with the residues comprising the liquid crystal polyester of the present invention.

These monomers are preferably used in an amount of 10 mol% or less and more preferably 5 mol% or less.

The working examples described hereinafter are intended to illustrate the present invention and should by no means be construed as limiting the scope of the invention.

In these example, the intrinsic viscosity ($\eta$) was measured using a 50:50 by weight mixture of phenol and 1,1,2,2-tetrachlorethane at 20° C. The transmittance was measured as follows. The liquid crystal polyester to be tested was comminuted to a size range passing through a 38-mesh sieve and 0.08 g of the resulting powder was placed in 19.92 g of a 50:50 (by weight) solvent mixture of phenol and 1,1,2,2-tetrachlorethane. The mixture was then heated at 140° to 155° C. and if necessary at 140° to 160° C. with stirring for 0.5 to 2 hours. The resulting solution was put in a quartz glass cell with a light path length of 10 mm and using the solvent mixture as a blank, the transmission of 530 nm light was measured with a spectrophotometer (UV-150-02, manufactured by Shimadzu Corporation). The following equation was used for the calculation of the transmittance of the test sample.

$$\text{Transmittance (\%)} = \frac{\text{Intensity of transmitted light}}{\text{Intensity of incident light}} \times 100$$

The melting temperature (Tm) was measured using a differential calorimeter DSC-2 manufactured by Perkin-Elmer at temperature increments of 20° C./minute.

The flow temperature (Tf) was measured using a flow tester CFT-500 manufactured by Shimadzu Corporation. Thus, using a load of 100 kg/cm$^2$ and a nozzle diameter of 0.5 mm, the temperature was increased from 200° C. at the rate of 10° C./minute and the temperature at which the polymer began to flow was measured and regarded as the flow temperature.

The notched Izod impact strength (IZ) was measured at a thickness of ⅛ inch in accordance with ASTM D-256.

The flexural modulus (Ef) was measured at the thickness of ⅛ inch in accordance with ASTM D-790.

The heat deformation temperature (HDT) was measured at the thickness of ⅛ inch in accordance with ASTM D 648.

The surface roughness was measured using a three-dimensional roughness tester (SE-3AK, manufactured by Kosaka Kenkyusho K.K.) at the central part of the same test bar as used in the measurement of Izod impact strength and the peak hill height was used.

The thermotropic liquid crystal property was identified by means of a Leitz palaralizing microscope with a hot stage.

Furthermore, in these examples, polyethylene terephthalate was abbreviated as PET and the minimum repeating unit of ethylene terephthalate was expressed as one mole.

The starting materials PET and paraacetoxybenzoic acid were used as thoroughly dried.

EXAMPLE 1

A liquid crystal polyester with a PET-parahydroxybenzoic acid mol ratio of 20:80 and lean in homopolymers was prepared in the following manner.

In the first step, a reactor was charged with chips of PEt with ($\eta$)=0.71 and powders of paraacetoxybenzoic acid in a mol ratio of 40:60 in a total amount of 50 kg. In the reactor, the starting materials were thoroughly dried under reduced pressure and, then, the reduced pressure was reinstated to atmospheric pressure by the introduction of nitrogen gas. Then, with nitrogen gas being fed to the reactor at a low rate, the temperature was increased to 270° C. to thereby completely melt the starting materials. This elevated temperature was maintained for 40 minutes to conduct the acidolysis reaction while acetic acid was distilled off. Thereafter, the reactor underwent the reduction of pressure according to a schedule providing a full vacuum (1 Torr) in 90 minutes, at the end of which time the temperature was progressively increased. Ultimately at a temperature of 280° C., the melt polycondensation reaction was carried out under a vacuum of 0.3 Torr for 3 hours and, then, the resulting polymer was processed into chips in a known manner.

The resulting polymer was a homopolymer-free liquid crystal polyester with an intrinsic viscosity ($\eta$) of 0.62, a transmittance of 99.7% and a flow temperature (Tf) of 189° C.

Then, in the second step, the reactor was charged with 30 kg of the dried polymer chips obtained in the first step and 36.3 g of paraacetoxybenzoic acid which was required to make up for the deficiency for the preparation of the desired polyester with a PET-to-parahydroxybenzoic acid mol ratio of 20:80. The reactor temperature was increased to 280° C. and the acidolysis reaction was conducted at this temperature for 40 minutes. Thereafter, the temperature was increased progressively to 300° C., at which temperature the melt polycondensation reaction was carried out under a vacuum of 0.3 Torr for 3 hours. The resulting liquid crystal polyester had an intrinsic viscosity ($\eta$) of 0.70, a transmittance of 98.7%, a melting temperature (Tm) of 278° C., a flow temperature (Tf) of 249° C., an Izod impact strength (IZ) of 30 kg·cm/cm, flexural modulus (Ef) of 85,000 kg/cm$^2$ and a heat deformation temperature (HDT) of 180° C.

Despite the fact that the resulting liquid crystal polyester had the same composition as the liquid crystal polyester according to Comparative Example 1 to be described hereinafter, the above liquid crystal polyester featured a higher transmittance value and a lesser homopolymer content. Moreover, compared with the product of Comparative Example 1, the polyester of this Example 1 was remarkably superior in heat deformation temperature and in the surface smoothness of moldings manufactured therefrom.

COMPARATIVE EXMAPLE 1

A reactor was charged with the same chips or PET with ($\eta$)=0.71 as used in Example 1 and paraacetoxybenzoic acid in a mol ratio of 20:80 in a total amount of 50 kg and the acidolysis reaction was conducted in the same manner as Example 1.

Then, the pressure of reaction system was reduced to a full vacuum (1 Torr) over a period of 90 minutes, and then the temperature was increased progressively to 300° C. At this temperature under a vacuum of 0.3 Torr, the melt polycondensation reaction was carried out for 3 hours to give a liquid crystal polyester showing a transmittance of 28.5%, a melting temperature (Tm) of 274° C., a flow temperature (Tf) of 239° C., an Izod impact strength (IZ) of 9 kg·cm/cm and a flexural modulus (Ef) of 60,000 kg/cm$^2$ This product was rich in homopolymer byproduct and its heat deformation temperature was also as low as 145° C., thus being remarkably inferior to the liquid crystal polyester according to Example 1.

EXAMPLES 2 TO 4

In the same manner as Example 1 except that the amount of paraacetoxybenzoic acid added in the second step was varied (further provided that the final viscosity build-up temperature in the second step was 310° C. in Examples 2 and 3), liquid crystal polyesters having PET-parahydroxybenzoic acid mol ratios of 18:82 (Example 2), 15:85 (Example 3) and 24:76 (Example 4) were obtained.

COMPARATIVE EXAMPLE 2

The acidolysis reaction was conducted in the same manner as Example 1 except that the mol ratio of PET chips and paraacetoxybenzoic acid powder in the first step was adjusted to 28:72.

Then, the pressure of reaction system was reduced according to a schedule providing a full vacuum (1 Torr) in 90 minutes, followed by progressive temperature increase to 300° C., whereupon the reaction mixture showed a marked decrease in fluidity. This reaction mixture was discharged, allowed to solidify and pulverized. The pulverized mixture was recharged into the reactor and the gradual temperature increase and pressure reduction were carried out. Finally, the solid-phase polymerization reaction was carried out at the temperature of 250° C. under a vacuum of 0.3 Torr for 10 hours. The resulting polymer was a homopolymer laden liquid crystal polyester with an intrinsic viscosity ($\eta$) of 0.59, a transmittance of 51.1% and a flow temperature (Tf) of 191° C.

Then, in the second step, the reactor was charged with 30 kg of the dry polymer chips obtained in the first step and 15.4 kg of paraacetoxybenzoic acid necessary for production of the desired polyester with a PET-parahydroxybenzoic acid mol ratio of 20:80. The reactor temperature was increased to 280° C. over a period of 3 hours and, then, the pressure of the reaction system was reduced according to a schedule providing a full vacuum (1 Torr) in 90 minutes. Then, the reaction temperature was increased progressively to 300° C., at which temperature the melt polycondensation reaction was conducted in a vacuum of 0.3 Torr for 3 hours. The resulting liquid crystal polyester had a transmittance of 36.9%, a melting temperature (Tm) of 273° C., a flow temperature (Tf) of 240° C., an Izod impact strength (IZ) of 10 kg·cm/cm, a flexural modulus (Ef) of 63,000 kg/cm$^2$, and a heat deformation temperature of 143° C.

Thus, where a large amount of paraacetoxybenzoic acid was reacted in the first step, only a homopolymer-laden liquid crystal polyester could be obtained.

COMPARATIVE EXAMPLE 3

A liquid crystal polyester was manufactured in the same manner as Example 1 except that the mol ratio of PET chips and paraacetoxybenzoic acid powder in the first step was adjusted to 75:25.

The resulting liquid crystal polyester was also laden in homopolymer, showing a transmittance of 76%, a melting temperature (Tm) of 282° C., a flow temperature (Tf) of 252° C., an Izod impact strength (IZ) of 7 kg·cm/cm, a flexural modulus (Ef) of 70,000 kg/cm$^2$, and a heat deformation temperature (HDT) of 139° C.

COMPARATIVE EXAMPLE 4

A liquid crystal polyester was manufactured in the same manner as Example 1 except that the final polymerization time at 300° C. in the second step was set at 0.5 hour.

The resulting liquid crystal polyester was a homopolymer-lean polyester with a transmittance of 99.0%, a melting temperature (Tm) of 269° C. and a flow temperature (Tf) of 242° C. but because of the low intrinsic viscosity ($\eta$) of 0.38, it was inferior in mechanical properties and heat resistance, showing an Izod impact strength (IZ) of 2 kg·cm/cm, a flexural modulus (Ef) of 68,000 kg/cm$^2$, and a heat deformation temperature (HDT) of 148° C.

EXAMPLES 5 TO 10

Liquid crystal polyesters were manufactured in the same manner as Example 1 except that the mol ratio of PET chips to paraacetoxybenzoic acid powder in the first step and the mol ratio of terephthalic acid residue to parahydroxybenzoic acid residue in the final liquid crystal polyester were varied as shown in Table 1.

EXAMPLE 11

In the same manner as Example 1, a polymer melt of the first step was obtained. Then, in the second step, a sufficient amount of paraacetoxybenzoic acid to assure a terephthalic acid residue-parahydroxybenzoic acid residue mol ratio of 20:80 in the final liquid crystal polyester was added to the above polymer melt in a nitrogen gas atmosphere. Thereupon, the mixture was partly solidified by cooling but as it was reheated to 280° C. over a period of 3 hours, it was fused again to give a homogeneous melt. Then, the pressure of the reaction system was reduced according to a schedule providing a full vacuum (1 Torr) in 90 minutes, after which the temperature was progressively increased to 300° C. At this temperature, the melt polycondensation reaction was carried out in a vacuum of 0.3 Torr for 3 hours.

The resulting polyester had an intrinsic viscosity ($\eta$) of 0.72, a transmittance of 99.5%, a melting temperature (Tm) of 278° C., a flow temperature (Tf) of 248° C., an Izod impact strength (IZ) of 28 kg·cm/cm, a flexural modulus (Ef) of 95,000 kg/cm$^2$ and a heat deformation temperature (HDT) of 181° C.

The results of Examples 1 through 11 and Comparative Examples 1 through 4 are shown in Table 1.

TABLE 1

| | 1 | 2 | 3 (dl/g) | 4 (%) | 5 (°C.) | 6 (°C.) | 7 (kg·cm/cm) | 8 (kg/cm$^2$) | 9 (°C.) | 10 C (%) | 10 H (%) | 10 O (%) | 11 ($\mu$) |
|---|---|---|---|---|---|---|---|---|---|---|---|---|---|
| Example 1 | 40/60 | 20/80 | 0.70 | 98.7 | 278 | 249 | 30 | 85000 | 180 | 67.9 | 3.6 | 28.5 | 0.4 |
| Example 2 | " | 18/82 | 0.72 | 97.1 | 284 | 254 | 27 | 87000 | 188 | 68.0 | 3.6 | 28.4 | 0.4 |
| Example 3 | " | 15/85 | 0.87 | 91.2 | 298 | 270 | 23 | 89000 | 216 | 68.3 | 3.5 | 28.2 | 0.5 |
| Example 4 | " | 24/76 | 0.72 | 99.0 | 274 | 243 | 22 | 83000 | 143 | 67.5 | 3.6 | 28.9 | 0.3 |
| Example 5 | 30/70 | 20/80 | 0.73 | 95.2 | 279 | 240 | 24 | 82000 | 178 | 67.9 | 3.5 | 28.6 | 0.4 |
| Example 6 | 50/50 | " | 0.75 | 99.8 | 278 | 249 | 30 | 86500 | 181 | 67.8 | 3.6 | 28.6 | 0.3 |
| Example 7 | 60/40 | " | 0.70 | 98.5 | 276 | 247 | 24 | 84000 | 179 | 67.9 | 3.6 | 28.5 | 0.4 |
| Example 8 | 70/30 | " | 0.69 | 96.2 | 281 | 247 | 22 | 83000 | 176 | 67.9 | 3.6 | 28.5 | 0.8 |
| Example 9 | 30/70 | 15/85 | 0.69 | 96.8 | 289 | 261 | 19 | 85000 | 189 | 68.4 | 3.5 | 28.1 | 1.2 |
| Example 10 | 50/50 | " | 0.88 | 97.5 | 288 | 261 | 20 | 88000 | 190 | 68.3 | 3.5 | 28.2 | 0.4 |
| Example 11 | 40/60 | 20/80 | 0.72 | 99.5 | 278 | 248 | 28 | 95000 | 181 | 68.3 | 3.6 | 28.1 | 0.4 |
| Comparative Example 1 | 20/80 | 20/80 | — | 28.5 | 274 | 239 | 9 | 60000 | 145 | 67.8 | 3.6 | 28.6 | 5.5 |
| Comparative Example 2 | 28/72 | " | — | 36.9 | 273 | 240 | 10 | 63000 | 143 | 67.8 | 3.5 | 28.7 | 4.5 |
| Comparative Example 3 | 75/25 | " | — | 76.0 | 282 | 252 | 7 | 70000 | 139 | 67.9 | 3.6 | 28.5 | 4.6 |

TABLE 1-continued

|  | 1 | 2 | 3 (dl/g) | 4 (%) | 5 (°C.) | 6 (°C.) | 7 (kg·cm/cm) | 8 (kg/cm²) | 9 (°C.) | 10 C (%) | 10 H (%) | 10 O (%) | 11 (μ) |
|---|---|---|---|---|---|---|---|---|---|---|---|---|---|
| Comparative Example 4 | 40/60 | " | 0.38 | 99.0 | 269 | 242 | 2 | 68000 | 148 | 67.8 | 3.6 | 28.6 | 0.3 |

Note:
1: Mol ratio of PET/4-HBA-A reacted in 1st step
2: Mol ratio of PET/4-HBA-A in final polyester
3: Intrinsic viscosity [η]
4: Transmittance
5: Melting temperature (Tm)
6: Flow temperature (Tf)
7: Izod impact strength (IZ)
8: Flexural modulus (Ef)
9: Heat deformation temperature (HDT)
10: Elemental analysis of polyester
11: Surface roughness of moldings
4-HBA-A: paraacetoxybenzoic acid

EXAMPLE 12

A homopolymer-lean liquid crystal polyester with a PET-parahydroxybenzoic acid mol ratio of 20:80 was manufactured as follows.

First, as the first step, the reactor was charged with chips of PET with (η)=0.71 and paraacetoxybenzoic acid powder in a mol ratio of 40:60 and in a total amount of 5 kg. In the reactor, the starting materials were thoroughly dried under reduced pressure and, then, the vacuum was broken to reinstate the atmospheric pressure with the introduction of nitrogen gas. Then, with nitrogen gas being fed to the reactor at a low flow rate, the temperature was increased to 275° C., whereby the starting materials were completely melted. Then, at this elevated temperature, the acidolysis reaction was allowed to proceed with elimination of acetic acid. The acetic acid ceased to be distilled out after 40 minutes to complete the acidolysis reaction.

Then, as the second step, the reactor was maintained at 275° C. and with nitrogen gas being fed thereto, 4.87 kg of paraacetoyybenzoic acid was added. This amount of paraacetoxybenzoic acid was required to make up for the deficiency of the same acid (consumed during the first step) to complete production of the desired polyester with a PET-parahydroxybenzoic acid mol ratio of 20:80, and prior to addition, the paraacetoxybenzoic acid was sufficiently nitrogen-purged in a nitrogen purging chamber disposed on the reactor. The addition was made in 3 portions of 1.62 kg each at 30-minute intervals. After completion of addition of the entire amount of paraacetoxybenzoic acid, the acidolysis reaction was further continued at 275° C. for 30 minutes. Thereafter, the temperature was increased progressively to 300° C., at which temperature the melt polycondensation reaction was conducted in a vacuum of 0.3 Torr for 4.5 hours. The resulting liquid crystal polyester had an intrinsic viscosity (η) of 0.70, a transmittance of 96.7%, a melting temperature (Tm) of 278° C., a flow temperature (Tf) of 248° C., an Izod impact strength (IZ) of 30 kg·cm/cm, a flexural modulus (Ef) of 83,000 kg/cm², and a heat deformation temperature (HDT) of 180° C.

Despite the fact that its composition was identical with the liquid crystal polyester of Comparative Example 1, the above liquid crystal polyester showed a higher transmittance value indicative of a low homopolymer content and a higher heat deformation temperature and, in addition, featured an improved surface smoothness of moldings.

EXAMPLE 13

The acidolysis reaction in the first step was conducted in the same manner as Example 12 to provide polyester fragments.

In the second step, a sufficient amount of paraacetoxybenzoic acid to make up for the deficiency for the Production of the desired polyester with a PET-parahydroxybenzoic acid mol ratio of 20:80 was added using a metering pump heat melting to the above polyester fragment melt over a period of 3 hours. After completion of the addition, the reaction mixture was further maintained at 275° C. for 40 minutes for acidolysis. Then, the pressure of the reaction system was reduced according to a schedule providing a full vacuum (1 Torr) in 90 minutes, after which time the temperature was increased progressively to 300° C. At this temperature, the melt polycondensation reaction was carried out in a vacuum of 0.3 Torr for 5 hours.

The resulting liquid crystal polyester had an intrinsic viscosity (η) of 0.72, a transmittance of 97.5%, a melting temperature (Tm) of 278° C., a flow temperature (Tf) of 248° C., an Izod impact strength (IZ) of 28 kg·cm/cm, a flexural modulus (Ef) of 84,000 kg/cm² and a heat deformation temperature (HDT) of 181° C.

EXAMPLE 14

The acidolysis reaction in the first step was conducted in the same manner as Example 12 to provide polyester fragments.

In the second step, a sufficient amount of paraacetoxybenzoic acid to make up for the deficiency for the production of the desired polyester with a PET-parahydroxybenzoic acid mol ratio of 20:80 was added to the above polyester fragment melt in a single dose after thorough nitrogen purging in a nitrogen purging chamber disposed on the reactor. After the addition, the reaction mixture was further maintained at 275° C. for 50 minutes to conduct the acidolysis reaction. Then, the pressure of reaction system was reduced according to a schedule providing a full vacuum of 1 Torr in 90 minutes and the temperature was progressively increased. Finally at 300° C., the melt polycondensation reaction was carried out in a vacuum of 0.3 Torr for 5 hours.

The resulting polyester had an intrinsic viscosity (η) of 0.73, a transmittance of 92.1%, a melting temperature (Tm) of 277° C., a flow temperature (Tf) of 247° C., an Izod impact strength (IZ) of 27 kg·cm/cm, a flexural modulus (Ef) of 81,000 kg/cm² and a heat deformation temperature (HDT) of 180° C.

EXAMPLE 15

A homopolymer-lean liquid crystal polyester with a PET-parahydroxybenzoic acid mol ratio of 15:85 was manufactured as follows.

The acidolysis reaction in the first step was conducted in the same manner as Example 12 to provide polyester fragments.

In the second step, 8.12 kg of paraacetoxybenzoic acid necessary to make up for the deficiency for the production of the desired polyester with a PET-parahydroxybenzoic acid mol ratio of 15:85 was subjected to nitrogen purging in the same manner as Example 1 and added to the above polyester fragment melt in 5 equal portions at 30-minute intervals. After ompletion of the addition, the reaction mixture was further maintained at 275° C. for 30 minutes to conduct the acidolysis reaction. Then, the pressure of reaction system was reduced according to a schedule providing a full vacuum of 1 Torr in 90 minutes, after which the temperature was progressively increased. Finally at 300° C., the melt polycondensation reaction was conducted in a vacuum of 0.3 Torr for 5 hours. The resulting polyester had an intrinsic trinsic viscosity ($\eta$) of 0.78, a transmittance of 89.1%, a melting temperature (Tm) of 296° C., a flow temperature (Tf) of 270° C., an Izod impact strength (IZ) of 20 kg·cm/cm, a flexural modulus (Ef) of 81,000 kg/cm$^2$ and a heat deformation temperature (HDT) of 216° C.

EXAMPLE 16

A homopolymer-lean liquid crystal polyester with a PET-parahydroxybenzoic acid mol ratio of 20:80 was manufactured as follows.

This polyester was manufactured in the same manner as Example 12 except that the mol ratio of PET chips to paraacetoxybenzoic acid powder in the first step was set at 35:65 and paraacetoxybenzoic acid (3.66 kg) was added in 3 portions of 1.22 kg each.

The resulting polyester had an intrinsic viscosity ($\eta$) of 0.69, a transmittance of 96.0%, a melting temperature (Tm) of 276° C., a flow temperature (Tf) of 247° C., an Izod impact strength (IZ) of 35 kg·m/cm, a flexural modulus (Ef) of 83,000 kg/cm$^2$ and a heat deformation temperature of 178° C.

The results of Examples 12 through 16 are shown in Table 2.

TABLE 2

| | 1 | 2 | 3 (dl/g) | 4 (%) | 5 (°C.) | 6 (°C.) | 7 (kg·cm/cm) | 8 (kg/cm$^2$) | 9 (°C.) | 10 C (%) | 10 H (%) | 10 O (%) | 11 ($\mu$) |
|---|---|---|---|---|---|---|---|---|---|---|---|---|---|
| Example 12 | 40/60 | 20/80 | 0.70 | 96.7 | 278 | 248 | 30 | 83000 | 180 | 67.9 | 3.6 | 28.5 | 0.4 |
| Example 13 | " | " | 0.72 | 97.5 | 278 | 248 | 28 | 84000 | 181 | 67.8 | 3.6 | 28.6 | 0.4 |
| Example 14 | " | " | 0.73 | 92.1 | 277 | 247 | 27 | 81000 | 180 | 67.9 | 3.6 | 28.5 | 0.6 |
| Example 15 | " | 15/85 | 0.78 | 89.1 | 296 | 270 | 20 | 81000 | 216 | 68.3 | 3.5 | 28.2 | 0.5 |
| Example 16 | 35/65 | 20/80 | 0.69 | 96.0 | 276 | 247 | 35 | 83000 | 178 | 67.9 | 3.6 | 28.5 | 0.3 |

Note:
1: Mol ratio of PET/4-HBA-A reacted in 1st step
2: Mol ratio of PET/4-HBA-A in final polyester
3: Intrinsic viscosity [$\eta$]
4: Transmittance
5: Melting temperature (Tm)
6: Flow temperature (Tf)
7: Izod impact strength (IZ)
8: Flexural modulus (Ef)
9: Heat deformation temperature (HDT)
10: Elemental analysis of polyester
11: Surface roughness of moldings
4-HBA-A: paraacetoxybenzoic acid While the invention has been described in detail and with reference to specific embodiments thereof, it will be apparent to one skilled in the art that various changes and modifications can be made therein without departing from the spirit and scope thereof.

What is claimed is:

1. A thermotropic liquid crystal polyester consisting essentially of:
   (i) an ethylene glycol residue,
   (ii) a terephthalic acid residue, and
   (iii) a parahydroxybenzoic acid residue wherein the mol ratio of the ethylene glycol residue to the terephthalic acid residue is substantially about 1:1 and the mol ratio of the terephthalic acid residue to the parahydroxybenzoic acid residue is in the range of 15.85 to 22.78, wherein said polyester has an intrinsic viscosity of at least 0.5 dl/g measured in a 50:50 by weight solvent mixture of phenol and 1,1,2,2-tetrachlorethane at 20° C., and a light transmittance at 530 nm of at least 80% at a light path length of 10 mm measured using a 0.4 wt% solution of said polyester in said solvent mixture.

2. A thermotropic liquid crystal polyester according to claim 1, wherein said intrinsic viscosity is at least 0.6 dl/g.

3. A thermotropic liquid crystal polyester according to claim 1, wherein said transmittance is at least 90%.

4. A thermotropic liquid crystal polyester according to claim 1, wherein said transmittance is at least 95%.

* * * * *